(12) United States Patent
Chou et al.

(10) Patent No.: US 10,047,288 B2
(45) Date of Patent: Aug. 14, 2018

(54) OPTICAL COMPOSITE MATERIAL COMPOSITION AND OPTICAL COMPOSITE MATERIAL COMPRISING THE SAME

(71) Applicant: Unique Materials Co., Ltd., Taipei (TW)

(72) Inventors: Pi-Tai Chou, Taipei (TW); Chia-Chun Hsieh, Taipei (TW)

(73) Assignee: Unique Materials Co., Ltd., Taipei (TW)

( * ) Notice: Subject to any disclaimer, the term of this patent is extended or adjusted under 35 U.S.C. 154(b) by 145 days.

(21) Appl. No.: 15/193,187

(22) Filed: Jun. 27, 2016

(65) Prior Publication Data

US 2017/0369778 A1  Dec. 28, 2017

(51) Int. Cl.
*C09K 11/88* (2006.01)

(52) U.S. Cl.
CPC .................................. *C09K 11/883* (2013.01)

(58) Field of Classification Search
CPC ...................................................... C09K 11/02
See application file for complete search history.

(56) References Cited

U.S. PATENT DOCUMENTS

| | | | | |
|---|---|---|---|---|
| 8,545,721 | B2 * | 10/2013 | Shim | C09D 7/1275 252/301.36 |
| 9,206,350 | B2 * | 12/2015 | Choi | C08F 20/10 |
| 2012/0113671 | A1 * | 5/2012 | Sadasivan | C09D 11/101 362/602 |
| 2015/0098212 | A1 * | 4/2015 | Won | G02F 1/133615 362/97.3 |

FOREIGN PATENT DOCUMENTS

WO   WO 2016/040308   *   3/2016

OTHER PUBLICATIONS

Derwent abstract for CN 103772872 A, May 7, 2014.*
Abstract for RU 2537603, Jan. 10, 2015.*

* cited by examiner

*Primary Examiner* — C Melissa Koslow
(74) *Attorney, Agent, or Firm* — JCIPRNET

(57) ABSTRACT

The invention relates to an optical composite material composition, comprising: 0.1 wt % to 15 wt % of a luminescent material; 5 wt % to 30 wt % of a surfactant having at least two thiol groups; 30 wt % to 50 wt % of a first acrylate monomer; 15 wt % to 30 wt % of a second acrylate monomer; 5 wt % to 20 wt % of a cross-linker; and 1 wt % to 2 wt % of an initiator. The invention also provides an optical composite material prepared by the optical composite material composition.

19 Claims, 2 Drawing Sheets

OPTICAL COMPOSITE MATERIAL COMPOSITION AND OPTICAL COMPOSITE MATERIAL COMPRISING THE SAME

BACKGROUND OF THE INVENTION

1. Field of the Invention

The present invention relates to an optical composite material composition and an optical composite material comprising the same. More specifically, the present invention relates to an optical composite material having improved resistance to fluoresce quenching due to oxygen and moisture degradation.

2. Description of Related Art

In recent years, quantum dot-containing composite materials and elements are utilized in displays and other optical devices, for example the back light module of a LCD display and LED device, which exhibit excellent effects, such as improved display performance, brightness, and color rendering index (CRI).

However, the stability of quantum dots is easily affected by external factors, such as heat, water, moisture, oxygen, volatile substances, and the likes. Recent developments on quantum dots and quantum dot-related technologies have mainly been focusing on the enhancement of quantum dot properties, color variations of quantum dots and the enhancement of display performance of an optical device by quantum dots. Even though the stability of quantum dots in optical composite materials may be a key issue for the possibility of broader application of quantum dot-containing optical composite materials, discussions on the stability enhancement of quantum dots are generally confined to altering the core, shell and surface ligand of quantum dots. On the other hand, the effects of other optical composite material components on the stability of quantum dots in the optical composite material are rarely examined. Therefore, it is desirable to provide an improved quantum dot-containing composite material in order to mitigate and/or obviate the stability problem of quantum dots without the utilization of barrier material.

SUMMARY OF THE INVENTION

An object of the present invention is to provide an optical composite material with an improved resistance to fluoresce quenching due to oxygen and moisture degradation.

Another object of the present invention is to provide an optical composite material with improved resistance to fluoresce quenching due to oxygen and moisture degradation, as well as increased stability and extended life span.

To achieve the aforesaid objects, an acrylate-based optical composite material composition is provided, which comprises 0.1 wt % to 15 wt % of a luminescent material; 5 wt % to 30 wt % of a surfactant having at least two thiol groups; 30 wt % to 50 wt % of a first acrylate monomer; 15 wt % to 30 wt % of a second acrylate monomer; 5 wt % to 20 wt % of a cross-linker; and 1 wt % to 2 wt % of an initiator.

Each component of the optical film composition may have a specific ratio. In particular, a weight percentage of the surfactant may be less than a weight percentage of the acrylate.

The luminescent material is not limited. Preferably, the luminescent material of the optical composite material composition of the present invention is a nanocrystal, which may have a core, a core-shell, a core-multishell, a core-alloy layer-shell, a core-alloy layer-multishell, or a combination thereof.

The "core", for example, may be at least one selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe, and PbTe; and alloys thereof. Further, the "shell" may be at least one selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, and PbTe; and alloys thereof. The core or the shell may be selected based on different needs and is not limited thereto.

In the optical composite material composition of the present invention, the surfactant may be a compound having multi-thiol groups and may be represented by one of the following formulae (I), (II) or (III):

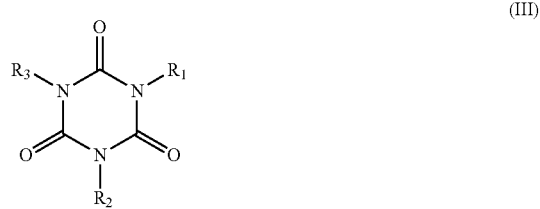

wherein $R_1$, $R_2$, $R_3$, $R_4$, $R_5$ and $R_6$ are different or the same, and are independently selected from the group consisting of hydrogen, $C_1$ to $C_{20}$ alkyl, $C_1$ to $C_{20}$ alkenyl, $C_1$ to $C_{20}$ alkynyl, $C_1$ to $C_{20}$ hydroxy alkyl, $C_1$ to $C_{20}$ alkyl ester, $C_1$ to $C_{20}$ alkyl ketone, $C_1$ to $C_{20}$ alkyl thiolether, and $C_1$ to $C_{20}$ alkoxy, and at least two of $R_1$ to $R_6$ are with thiol substituent groups.

$C_1$ to $C_{20}$ alkyl may be linear or branched alkyl, and may be, for example, methyl, ethyl, propyl, n-butyl, isobutyl, pentyl, hexyl, heptyl, or the likes; however, the invention is not limited thereto.

$C_1$ to $C_{20}$ alkenyl may be linear or branched alkenyl, and may be, for example, ethenyl, propenyl, butenyl, pentenyl, hexenyl, heptenyl, or the likes; however, the invention is not limited thereto.

$C_1$ to $C_{20}$ alkynyl may be linear or branched alkynyl, and may be, for example, ethynyl, propynyl, butynyl, pentynyl, hexynyl, heptynyl, or the likes; however, the invention is not limited thereto.

$C_1$ to $C_{20}$ hydroxy alkyl may be linear or branched hydroxy alkyl, and may be, for example, hydroxy methyl, hydroxy ethyl, hydroxy propyl, hydroxy butyl, hydroxy pentyl, hydroxy hexyl, hydroxy heptyl, or the likes; however, the invention is not limited thereto.

$C_1$ to $C_{20}$ alkyl ester may be linear or branched alkyl ester, and may be, for example, methyl methanoate, methyl ethanoate, ethyl propanoate, ethyl butanoate, methyl pentanoate, methyl hexanoate, methyl heptanoate, or the likes; however, the invention is not limited thereto.

$C_1$ to $C_{20}$ alkyl ketone may be linear or branched alkyl ketone, and may be, for example, ethyl propanone, ethyl butanone, methyl pentanone, methyl hexanone, methyl heptanone, methyl octanone or the likes; however, the invention is not limited thereto.

$C_1$ to $C_{20}$ alkyl thiolether may be linear or branched alkyl thiolether, and may be, for example, dimethylsulfanyl, diethylsulfanyl, ethyl propylsulfanyl, methyl butylsulfanyl, methyl pentylsulfanyl, methyl hexylsulfanyl, methyl heptylsulfanyl or the likes; however, the invention is not limited thereto.

$C_1$ to $C_{20}$ alkoxy may be linear or branched alkoxy, and may be, for example, methoxy, ethoxy, propoxy, butoxy, pentyloxy, hexyloxy, heptyloxy, or the likes; however, the invention is not limited thereto.

Preferably, in the surfactant of formulae (I), (II) or (III), at least two of $R_1$ to $R_6$ are $C_1$ to $C_{20}$ alkyl with thiol substituent groups. For example, both $R_1$ and $R_2$ are $C_1$ to $C_{20}$ alkyl with thiol substituent groups; $R_1$, $R_2$, and $R_3$ are $C_1$ to $C_{20}$ alkyl with thiol substituent groups; $R_1$, $R_2$, $R_3$, and $R_4$ are $C_1$ to $C_{20}$ alkyl with thiol substituent groups; $R_1$, $R_3$, $R_4$ and $R_6$ are $C_1$ to $C_{20}$ alkyl with thiol substituent groups; or $R_1$, $R_4$, $R_5$ and $R_6$ are $C_1$ to $C_{20}$ alkyl with thiol substituent groups.

In another embodiment, in the surfactant of formula (I), (II) or (III), at least two of $R_1$ to $R_6$ are $C_1$ to $C_{20}$ alkyl ester with thiol substituent groups. For example, both $R_1$ and $R_2$ are $C_1$ to $C_{20}$ alkyl ester with thiol substituent groups; $R_1$, $R_2$, and $R_3$ are $C_1$ to $C_{20}$ alkyl ester with thiol substituent groups; $R_1$, $R_2$, $R_3$, and $R_4$ are $C_1$ to $C_{20}$ alkyl ester with thiol substituent groups; $R_1$, $R_3$, $R_4$ and $R_6$ are $C_1$ to $C_{20}$ alkyl ester with thiol substituent groups; or $R_1$, $R_4$, $R_5$ and $R_6$ are $C_1$ to $C_{20}$ alkyl ester with thiol substituent groups.

In another embodiment, in the surfactant of formula (I), (II) or (III), at least two of $R_1$ to $R_6$ are $C_1$ to $C_{20}$ alkyl ketone with thiol substituent groups. For example, both $R_1$ and $R_2$ are $C_1$ to $C_{20}$ alkyl ester with thiol substituent groups; $R_1$, $R_2$, and $R_3$ are $C_1$ to $C_{20}$ alkyl ester with thiol substituent groups; $R_1$, $R_2$, $R_3$, and $R_4$ are $C_1$ to $C_{20}$ alkyl ester with thiol substituent groups; $R_1$, $R_3$, $R_4$ and $R_6$ are $C_1$ to $C_{20}$ alkyl ester with thiol substituent groups; or $R_1$, $R_4$, $R_5$ and $R_6$ are $C_1$ to $C_{20}$ alkyl ester with thiol substituent groups.

In another embodiment, in the surfactant of formula (I), (II) or (III), at least two of $R_1$ to $R_6$ are $C_1$ to $C_{20}$ alkyl thiolether with thiol substituent groups. For example, both $R_1$ and $R_2$ are $C_1$ to $C_{20}$ alkyl ester with thiol substituent groups; $R_1$, $R_2$, and $R_3$ are $C_1$ to $C_{20}$ alkyl ester with thiol substituent groups; $R_1$, $R_2$, $R_3$, and $R_4$ are $C_1$ to $C_{20}$ alkyl ester with thiol substituent groups; $R_1$, $R_3$, $R_4$ and $R_6$ are $C_1$ to $C_{20}$ alkyl ester with thiol substituent groups; or $R_1$, $R_4$, $R_5$ and $R_6$ are $C_1$ to $C_{20}$ alkyl ester with thiol substituent groups.

In another embodiment, in the surfactant of formula (I), (II) or (III), at least two of $R_1$ to $R_4$ are $C_1$ to $C_{20}$ alkoxy with thiol substituent groups. For example, both $R_1$ and $R_2$ are $C_1$ to $C_{20}$ alkoxy with thiol substituent groups; $R_1$, $R_2$, and $R_3$ are $C_1$ to $C_{20}$ alkoxy with thiol substituent groups; $R_1$, $R_2$, $R_3$, and $R_4$ are $C_1$ to $C_{20}$ alkoxy with thiol substituent groups; $R_1$, $R_3$, $R_4$ and $R_6$ are $C_1$ to $C_{20}$ alkoxy with thiol substituent groups; or $R_1$, $R_4$, $R_5$ and $R_6$ are $C_1$ to $C_{20}$ alkoxy with thiol substituent groups.

Preferably, the surfactant of formulae (I), (II), (III) has a molecular weight ranging from 100 to 1000, and more preferably, from 100 to 500.

Said compound fulfills the role of surfactant and increases the resistance of luminescent material such as quantum dots against external interfering substances. Additionally, due to the presence of multiple thiol groups, the thiol groups not interacting with quantum dots are able to crosslink with other components in the optical composite material, thereby forming a more stable optical composite material. Comparing with conventional methods that use amine-based compounds, the interaction of thiol group and the luminescent material as quantum dots in the present invention results in an optical composite material with an improved stability. Thus, even if the resulted optical composite material is exposed to light or is in contact with external interfering substances, such as water, moisture, oxygen, or the likes, these external interfering factors will not affect the function of the optical composite material, thus effectively eliminating the need for barrier material.

In the optical composite material composition of the present invention, the surfactant may be a compound selected from 1,3-propanedithiol, 2,2'-thiodiethanethiol, 1,3-benzenedithiol, 1,3-benzenedimethanethiol, glycol dimercaptoacetate, trimethylolpropane trimercaptoacetate, tris[2-(3-mercaptopropionyloxy)ethyl]isocyanurate; however, the invention is not limited thereto.

The first acrylate monomer of the optical composite material composition of the present invention may have a molecular weight of 100 to 1000. The first acrylate monomer may be selected from group consisting of methyl methacrylate, ethyl methacrylate, isopropyl methacrylate, n-butyl methacrylate, i-butyl methacrylate, tert-butyl methacrylate, n-amyl methacrylate, isoamyl methacrylate, n-hexyl methacrylate, tridecyl methacrylate, stearyl methacrylate, decyl methacrylate, dodecyl methacrylate, methoxydiethylene glycol methacrylate, phenyl methacrylate, phenoxyethyl methacrylate, tetrahydrofurfuryl methacrylate, tert-butylcyclohexyl methacrylate, behenyl methacrylate, dicyclopentanyl methacrylate, dicyclopentenyloxyethyl methacrylate, 2-ethylhexyl methacrylate, octyl methacrylate, isooctyl methacrylate, n-decyl methacrylate, isodecyl methacrylate, lauryl methacrylate, hexadecyl methacrylate, octadecyl methacrylate, benzyl methacrylate, 2-phenylethyl methacrylate, 2-phenoxyethyl acrylate, cyclic trimethylolpropane formal acrylate, cyclohexyl methacrylate, and 4-tert-butylcyclohexyl acrylate. However, the first acrylate monomer used in the optical composite material composition of the present invention is not limited to the aforesaid compounds, but can be selected from the first acrylate monomers known in the arts based on different needs.

As for the second acrylate monomer of the optical composite material composition of the present invention, the second acrylate monomer may have a molecular weight ranging from 200 to 10,000. In some embodiments, a molecular weight of the second acrylate monomer is greater than a molecular weight of the first acrylate monomer. Examples of the second acrylate monomer used in the present invention may be neopentyl glycol propoxylate diacrylate, diethylene glycol dimethacrylate, 1,6-hexanediol diacrylate, 1,6-hexanediol dimethacrylate, 1,12-dodecanediol dimethacrylate, triallyl isocyanurate, and polyethylene glycol dimethacrylate.

The cross-linker is not limited in the optical composite material composition of the present invention and may be any cross-linker that is suitable for acrylate-based systems with a molecular weight ranging from 100 to 2000.

Examples of the cross-linker used in the present invention may be 4-hydroxybutyl acrylate, 4-hydroxybutyl acrylate glycidylether, diallyl phthalate, 1,4-cyclohexane dimethanol monoacrylate, trimethallyl isocyanurate, and [2[1,1-dimethyl-2-[(1-oxoallyl)oxy]ethyl]-5-ethyl-1,3-dioxan-5-yl] methyl acrylate.

Further, the initiator of the optical composite material composition of the present invention may be a photo initiator or a thermal initiator. Considering practicability, in an embodiment of the optical composite material composition of the present invention, the initiator is preferably a photo initiator, so that an optical composite material can be obtained simply by exposing the optical composite material composition to light with minimal curing time. Any known polymerization initiator can be used in the present invention, and the initiator includes, but is not limited to, the following: benzoin ethers, benzyl ketals, a-dialkoxy-acetophenones, a-amino-alkylphenones, acylphosphine oxides, benzophenones, thioxanthones, titanocenes, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, methylbenzoylformate, oxy-phenyl-acetic acid 2-[2 oxo-2 phenyl-acetoxy-ethoxy]-ethyl ester, oxy-phenyl-acetic 2-[2-hydroxy-ethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, and diphenyl(2,4,6-trimethylbenzoyl)phosphine oxide.

The optical composite material may be constructed into various shapes and dimensions depending on the application of the end product. Examples may be dots, lines, films, cubes, cylindrical rods, rectangular rods, semi spheres or the likes; however, the invention is not limited thereto.

In some embodiments wherein the optical composite material was constructed into a film of 100 μm in thickness sandwiched between two PET sheets without other gas barrier materials or coating. The environmental tests showed no luminance decay for the constructed film. Even without extra gas barriers, the constructed film already exhibits same abilities in the inhibition of the transmission of oxygen and water vapor as a commercially available quantum dot-containing optical film containing a gas barrier with a water vapor transmission rate of $10^{-1} \sim 10^{-3}$ g/(m².day) when tested at 40° C., 100% relative humidity.

The optical composite material composition of the present invention may have further addition of particles of less than equal parts to the total weight of luminescent material, surfactant, first acrylate monomer, second acrylate monomer, acrylate cross-linker and photo initiator, wherein the particles are selected from group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoro-olefin, polycarbonate, polystyrene, and a combination thereof. The particle size is preferably in a range from 1 to 30 micrometers. These particles are used to scatter incident source light, increasing the chance of the source light interacting with the luminescent material, thereby enhancing the absorption and conversion efficiency of the source light wavelength by the luminescent material. These particles are used to scatter emitted light as well, increasing the chance of the emitted light interacting with the surface of the optical composite material, thereby enhancing the efficiency of the emitted light exiting the optical composite material.

An optical composite material is also provided in the present invention. The optical composite material is prepared from the optical composite material composition described above. The optical composite material may comprise: 0.1 wt % to 15 wt % of a luminescent material and 85 wt % to 99.9 wt % of an acrylate-based polymer, and the luminescent material is evenly dispersed in the acrylate-based polymer. The acrylate-based polymer may be prepared from precursors comprising: 5 wt % to 30 wt % of a surfactant having at least two thiol groups; 30 wt % to 50 wt % of a first acrylate monomer; 15 wt % to 30 wt % of a second acrylate monomer; 5 wt % to 20 wt % a cross-linker; and 1 wt % to 2 wt % of an initiator. To obtain an optical composite material with enhanced optical properties, the acrylate-based polymer may have further addition of particles of less than equal parts to the total weight of the luminescent material and acrylate-based polymer, wherein the particles are selected from the group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoro-olefin, polycarbonate, polystyrene, and a combination thereof.

All technical terms used herein have the same definition as those commonly used in related arts unless otherwise specified. The terms herein are used so that person having ordinary skill in the art can have a better understanding of the present invention and are not intended to limit the scope of the present invention. Other objects, advantages, and novel features of the present invention will become more apparent from the following detailed description when taken in conjunction with the accompanying drawings.

DETAILED DESCRIPTION OF THE PREFERRED EMBODIMENT

Example 1

The components and the amounts thereof of the optical composite material composition of Example 1 are listed in Table 1 below.

TABLE 1

| luminescent material | surfactant | first acrylate monomer | second acrylate monomer | cross-linker | initiator |
|---|---|---|---|---|---|
| CdSe/ZnS | Tris [2-(3-mercapto- | 2-phenylethyl methacrylate | Neopentyl glycol | [2[1,1-dimethyl-2-[(1-oxoallyl)oxy] | Diphenyl (2,4,6-trimethylbenzoyl)- |

TABLE 1-continued

| luminescent material | surfactant | first acrylate monomer | second acrylate monomer | cross-linker | initiator |
|---|---|---|---|---|---|
| | propionyloxy) ethyl] isocyanurate | | propoxylate diacrylate | ethyl]-5-ethyl-1,3-dioxan-5-yl]methyl acrylate | phosphine oxide |
| 5% | 13% | 49% | 16% | 16% | 1% |

Figure 1:
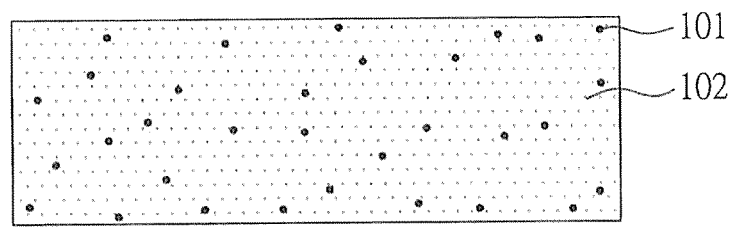
FIG. 1 is a schematic view of an optical composite material.
Figure 2:
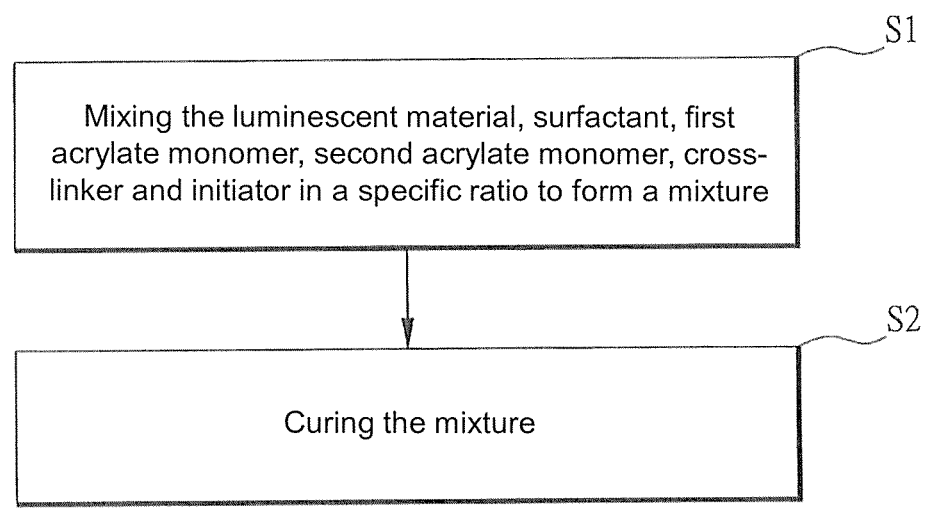
FIG. 2 is a flow diagram of a method for forming an optical composite material.

Please refer to FIGS. 1 and 2. FIG. 1 is a schematic view of an optical composite material. FIG. 2 is a flow diagram of a method of forming an optical composite material. As shown in FIG. 2, all the components in Table 1 were first added and mixed together to form a mixture (S1). The mixture was sonicated for 30 to 90 minutes in the dark to fully disperse CdSe/ZnS quantum dot within the mixture. The mixture was then sandwiched in-between two polyethylene terephthalate (PET) substrates through roll-to-roll process and subjected to exposure under UV light (370 nm, 400 W, 1 minute) to form an optical film that is an optical composite material (S2) between two PET sheets. As shown in FIG. 1, the luminescent material CdSe/ZnS 101 is dispersed in the acrylate-based polymer 102. Precursors for preparing the acrylate-based polymer 102 may comprise the surfactant, the first acrylate monomer, the second acrylate monomer, the cross-linker, and the initiator in Table 1.

Example 2

The preparation of the optical composite material of Example 2 was the same as that described for Example 1, except the components and the ratios thereof of the optical composite material composition of Example 2 are different from Example 1.

The components and the amounts thereof of the optical composite material composition of Example 2 are listed in Table 2 below.

TABLE 2

| luminescent material | Surfactant | first acrylate monomer | second acrylate monomer | cross-linker | initiator |
|---|---|---|---|---|---|
| CdSe/ZnS | Glycol Dimercaptoacetate | 2-phenylethyl acrylate | 1,6-hexanediol dimethacrylate | [2[1,1-dimethyl-2-[(1-oxoallyl)oxy]ethyl]-5-ethyl-1,3-dioxan-5-yl] methyl acrylate | Diphenyl (2,4,6-trimethyl benzoyl)-phosphine oxide |
| 10% | 16% | 49% | 16% | 8% | 1% |

After the components were mixed according to ratios stated in Table 2, the optical composite material was dotted onto 450 nm blue LED chip and subjected to exposure under UV light (370 nm, 400 W, 3 minute)

Example 3

The preparation of the optical composite material of Example 3 was the same as that described for Example 1, except the components and the ratios thereof of the optical composite material composition of Example 3 are different from Example 1.

The components and the amounts thereof of the optical composite material composition of Example 3 are listed in Table 3 below.

TABLE 3

| luminescent material | surfactant | first acrylate monomer | second acrylate monomer | cross-linker | initiator |
|---|---|---|---|---|---|
| CdSe/ZnS | Trimethylolpropane trimercaptoacetate | Cyclic trimethylolpropane formal acrylate | Triallyl isocyanurate | Diallyl phalate | Diphenyl (2,4,6-trimethyl benzoyl)-phosphine oxide |
| 15% | 15% | 38% | 24% | 6% | 2% |

After the components were mixed, the mixture was filled into transparent acrylic tubes with outer diameter of 16 mm, inner diameter of 13 mm and subjected to exposure under a UV light (370 nm, 400 W, 10 minutes).

It should be known that in FIG. 2, in the example above, after mixing the components listed in table to form a mixture (S1), the mixture was sandwiched in-between two polyethylene terephthalate (PET) substrates through roll-to-roll process, dotted on a substrate, or placed into a mold before the curing step of (S2). However, the invention is not limited thereto, and may implemented as other shapes based on the needs, for example, the mixture may be constructed into dots, lines, films, cubes, cylindrical rods, rectangular rods, semi spheres or the likes. Further, there is an optional step after curing based on the needs, which is to remove cured optical composite material from the substrate or the mold.

Experiment Example

In order to confirm stability of the optical composite material under high temperature and humidity, the optical composite material prepared in Example 1 was subjected to an environmental test. In detail, the optical film was then stored at 65° C., 95% relative humidity for 1000 hours. The luminance from the optical film was measured with CS-100 Color and Luminance Meter (Konica Minolta) at the indicated time interval.

Figure 3:
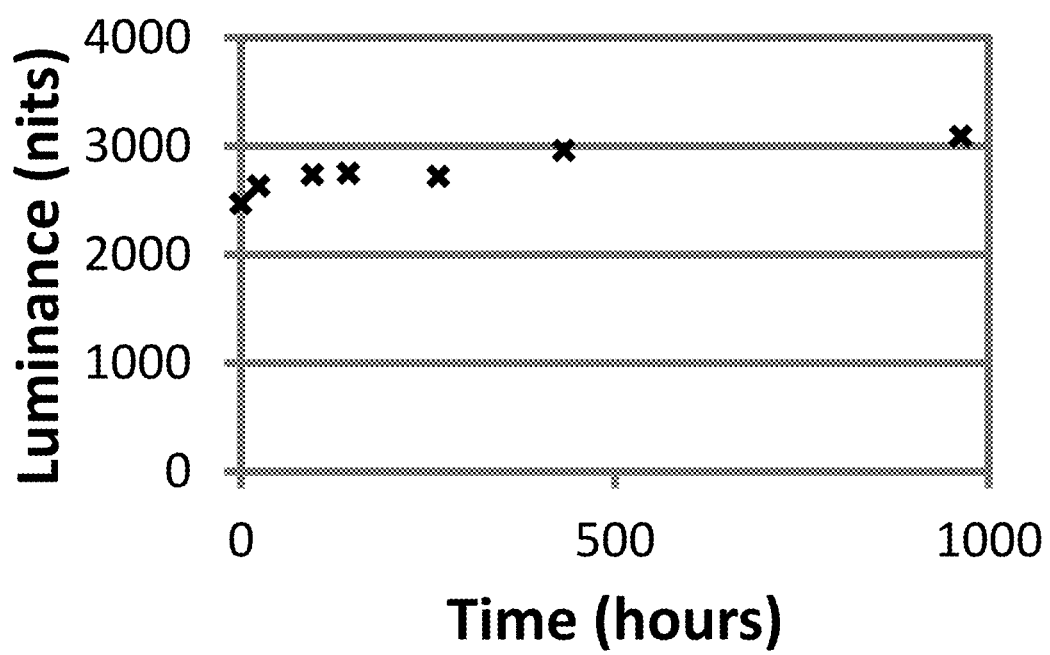
FIG. 3 is an environmental test result of the optical composite material of the present invention.

The test result of the example 1 of the invention shown in FIG. 3 clearly illustrated that even without the protection of physical barriers against moisture and oxygen, the luminance of the quantum dot-containing optical film did not decrease after storing in high heat and humidity environment for approximately 1000 hours. This demonstrated that the optical composite material was able to mitigate and/or obviate the stability problem of quantum dots without the utilization of barrier material.

As a comparison, a commercially available quantum dot-containing optical film was also stored at 65° C., 95% relative humidity. Due to the presence of barrier materials protecting the quantum dot component of the optical film, the commercially available quantum dot-containing optical film can maintain its luminance under such environment (65° C., 95% relative humidity) for at least 1000 hours (not shown).

Although the present invention has been explained in relation to its preferred embodiment, it is to be understood that many other possible modifications and variations can be made without departing from the spirit and scope of the present invention as hereinafter claimed.

What is claimed is:

1. An optical composite material composition, comprising:
   0.1 wt % to 15 wt % of a luminescent material;
   5 wt % to 30 wt % of a surfactant having at least two thiol groups;
   30 wt % to 50 wt % of a first acrylate monomer;
   15 wt % to 30 wt % of a second acrylate monomer;
   5 wt % to 20 wt % of a cross linker; and
   1 wt % to 2 wt % of an initiator.

2. The optical composite material composition as claimed in claim 1, wherein a weight percentage of the surfactant is less than a weight percentage of the first acrylate monomer.

3. The optical composite material composition as claimed in claim 1, wherein the luminescent material is a nanocrystal that has a core, a core-shell, a core-multishell, a core-alloy layer-shell, a core-alloy layer-multishell structure, or a combination thereof.

4. The optical composite material composition as claimed in claim 3, wherein at least one core is selected from the group consisting of CdS, CdSe, CdTe, ZnS, ZnSe, ZnTe, HgS, HgSe, HgTe, GaN, GaP, GaAs, InP, InAs, InSb, AlN, AlP, AlAs, AlSb, SiC, Fe, Pt, Ni, Co, Al, Ag, Au, Cu, FePt, Si, Ge, PbS, PbSe and PbTe; and alloys thereof.

5. The optical composite material composition as claimed in claim 3, wherein at least one shell is selected from the group consisting of ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe and PbTe; and alloys thereof.

6. The optical composite material composition as claimed in claim 1, wherein the surfactant is represented as one of the following formulae (I), (II), or (III):

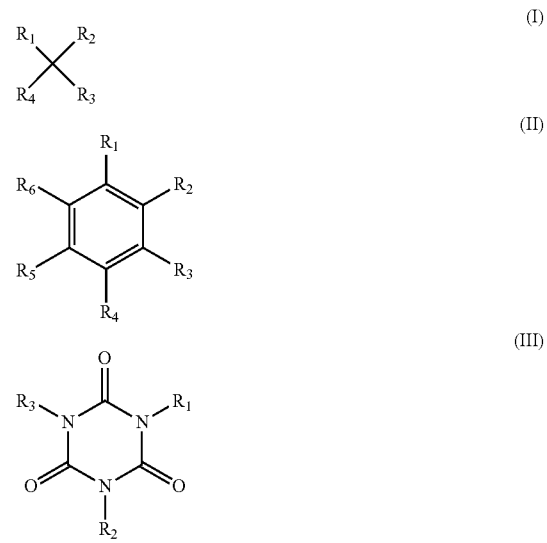

wherein, $R_1$, $R_2$, $R_3$, $R_4$, $R_5$, and $R_6$ are different or the same, and are independently selected from the group consisting of hydrogen, $C_1$ to $C_{20}$ alkyl, $C_1$ to $C_{20}$ alkenyl, $C_1$ to $C_{20}$ alkynyl, $C_1$ to $C_{20}$ hydroxy alkyl, $C_1$ to $C_{20}$ alkyl ester, $C_1$ to $C_{20}$ alkyl ketone, $C_1$ to $C_{20}$ alkyl thiolether, and $C_1$ to $C_{20}$ alkoxy, and at least two of $R_1$ to $R_6$ are with thiol substituent groups.

7. The optical composite material composition as claimed in claim 6, wherein at least two of $R_1$ to $R_6$ are $C_1$ to $C_{20}$ alkyl with thiol substituent groups.

8. The optical composite material composition as claimed in claim 6, wherein at least two of $R_1$ to $R_6$ are $C_1$ to $C_{20}$ alkyl ester with thiol substituent groups.

9. The optical composite material composition as claimed in claim 6, wherein at least two of $R_1$ to $R_6$ are $C_1$ to $C_{20}$ alkoxy with thiol substituent groups.

10. The optical composite material composition as claimed in claim 6, wherein at least one of the thiol groups of the surfactant participates in cross-linking.

11. The optical composite material composition as claimed in claim 6, wherein the surfactant has a molecular weight ranging from 100 to 1000.

12. The optical composite material composition as claimed in claim 1, wherein the first acrylate monomer has a molecular weight of 100 to 1000.

13. The optical composite material composition as claimed in claim 1, wherein the first acrylate monomer is selected from group consisting of methyl methacrylate, ethyl methacrylate, isopropyl methacrylate, n-butyl methacrylate, i-butyl methacrylate, tert-butyl methacrylate, n-amyl methacrylate, isoamyl methacrylate, n-hexyl methacrylate, tridecyl methacrylate, stearyl methacrylate, decyl methacrylate, dodecyl methacrylate, methoxydiethylene glycol methacrylate, phenyl methacrylate, phenoxyethyl methacrylate, tetrahydrofurfuryl methacrylate, tert-butylcyclohexyl methacrylate, behenyl methacrylate, dicyclopentanyl methacrylate, dicyclopentenyloxyethyl methacrylate, 2-ethylhexyl methacrylate, octyl methacrylate, isooctyl methacrylate, n-decyl methacrylate, isodecyl methacrylate, lauryl methacrylate, hexadecyl methacrylate, octadecyl methacrylate, benzyl methacrylate, 2-phenylethyl methacrylate, 2-phenoxyethyl acrylate, cyclic trimethylolpropane formal acrylate, cyclohexyl methacrylate, and 4-tert-butylcyclohexyl acrylate.

14. The optical composite material composition as claimed in claim 1, wherein the second acrylate monomer has a molecular weight ranging from 200 to 10,000.

15. The optical composite material composition as claimed in claim 1, wherein the acrylate crosslinker has a molecular weight ranging from 100 to 2000.

16. The optical composite material composition as claimed in claim 1, wherein the initiator is a photo initiator or a thermal initiator.

17. The optical composite material composition as claimed in claim 1, further comprising of particles of less than equal parts to the combined weight of the luminescent material, the surfactant, the first acrylate monomer, the second acrylate monomer, the cross-linker and the photo initiator, wherein the particles are selected from group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoro-olefin, polycarbonate, polystyrene, and a combination thereof.

18. An optical composite material, comprising:
0.1 wt % to 15 wt % of a luminescent material; and
85 wt % to 99.9 wt % of an acrylate-based polymer;
wherein the luminescent material is dispersed in the acrylate-based polymer,
wherein the acrylate-based polymer is prepared from precursors comprising:
5 wt % to 30 wt % of a surfactant having at least two thiol groups;
30 wt % to 50 wt % of a first acrylate monomer;
15 wt % to 30 wt % of a second acrylate monomer;
5 wt % to 20 wt % a cross-linker; and
1 wt % to 2 wt % of an initiator.

19. The optical composite material as claimed in claim 18, wherein the composite material further comprises of particles of less than equal parts to the total weight of the luminescent material and acrylate-based polymer, particles selected from the group consisting of titanium dioxide, zinc oxide, zinc sulfide, silica, zirconium oxide, antimony trioxide, alumina, Lonsdaleite, diamond-like carbon, bismuth oxychloride (BiOCl), barium titanate, potassium lithium niobate, lithium niobate, lithium tantalate, proustite, polyfluoro-olefin, polycarbonate, polystyrene, and a combination thereof.

* * * * *